No. 772,445. PATENTED OCT. 18, 1904.
E. C. WASHBURN.
CAR COUPLING.
APPLICATION FILED JUNE 6, 1904.
NO MODEL. 2 SHEETS—SHEET 1.

Witnesses.
H. S. Kilgore
R. C. Mabry

Inventor.
Edwin C. Washburn.
By his Attorneys.
Williamson & Mucha

No. 772,445. PATENTED OCT. 18, 1904.
E. C. WASHBURN.
CAR COUPLING.
APPLICATION FILED JUNE 6, 1904.
NO MODEL. 2 SHEETS—SHEET 2.
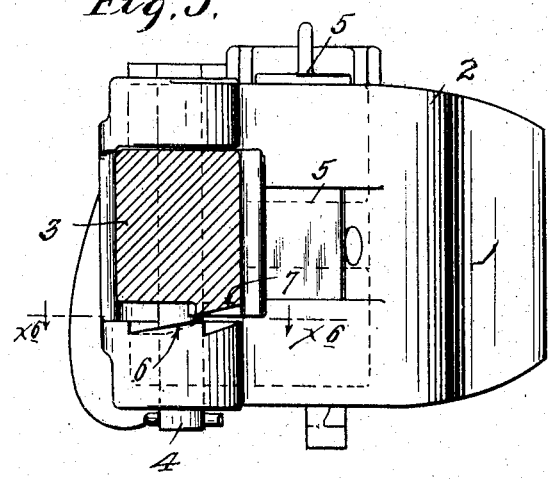
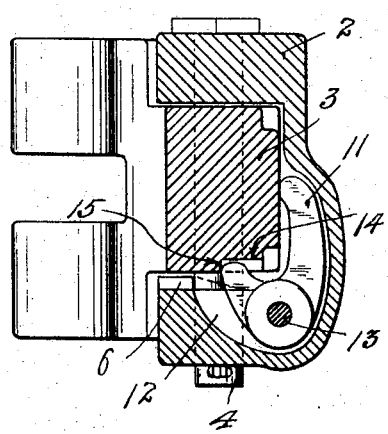
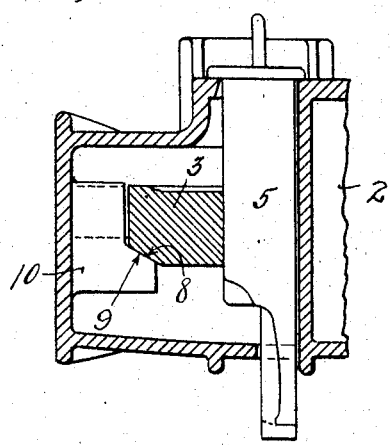
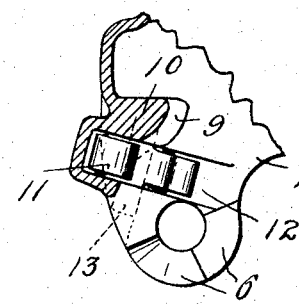
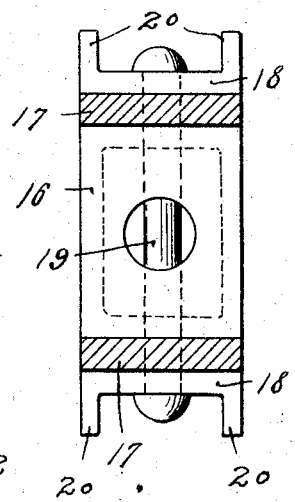
Witnesses.
H. D. Kilgore
R. C. Mabry
Inventor:
Edwin C. Washburn,
By his Attorneys
Williamson & Merchant No. 772,445. Patented October 18, 1904.

UNITED STATES PATENT OFFICE.

EDWIN C. WASHBURN, OF MINNEAPOLIS, MINNESOTA.

CAR-COUPLING.

SPECIFICATION forming part of Letters Patent No. 772,445, dated October 18, 1904.

Application filed June 6, 1904. Serial No. 211,254. (No model.)

*To all whom it may concern:*

Be it known that I, EDWIN C. WASHBURN, a citizen of the United States, residing at Minneapolis, in the county of Hennepin and State of Minnesota, have invented certain new and useful Improvements in Car-Couplers; and I do hereby declare the following to be a full, clear, and exact description of the invention, such as will enable others skilled in the art to which it appertains to make and use the same.

My present invention relates to car-couplers, and has for its primary object to provide improved means for automatically opening the pivoted knuckles thereof.

To the above end and to others which will be hereinafter noted the invention consists of the novel devices and combinations of devices hereinafter described, and defined in the claims.

It may be here stated that this invention has reference to car-couplers of the well-known "Master Car-Builders'" type, and particularly to the type generally known to the trade as the "Washburn" coupler.

The invention is illustrated in the accompanying drawings, wherein like characters indicate like parts throughout the several views.

Figure 1:
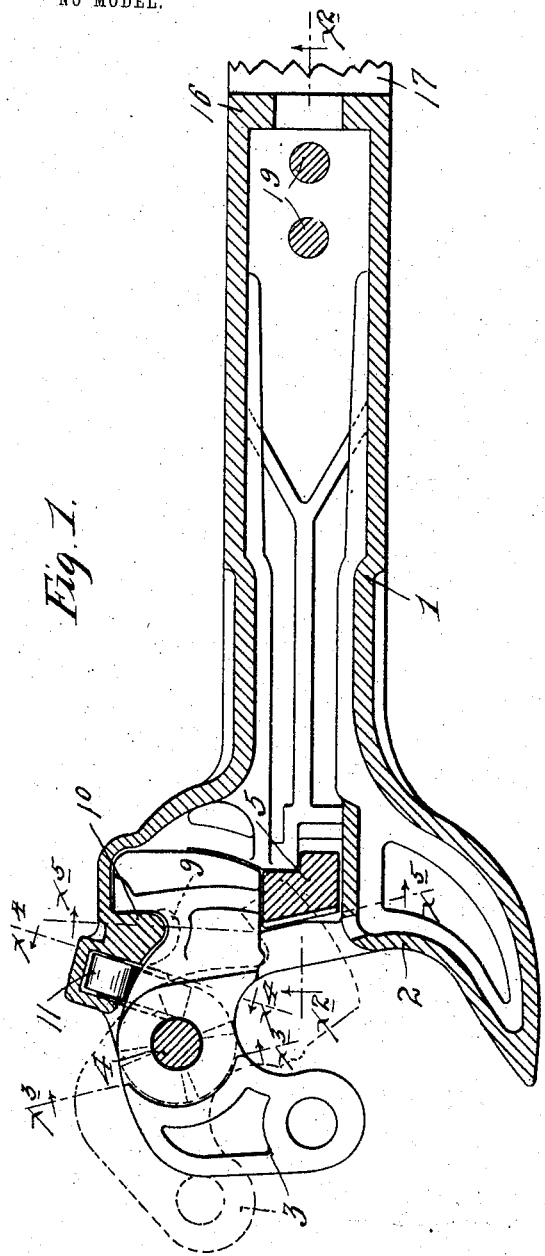
Figure 2:
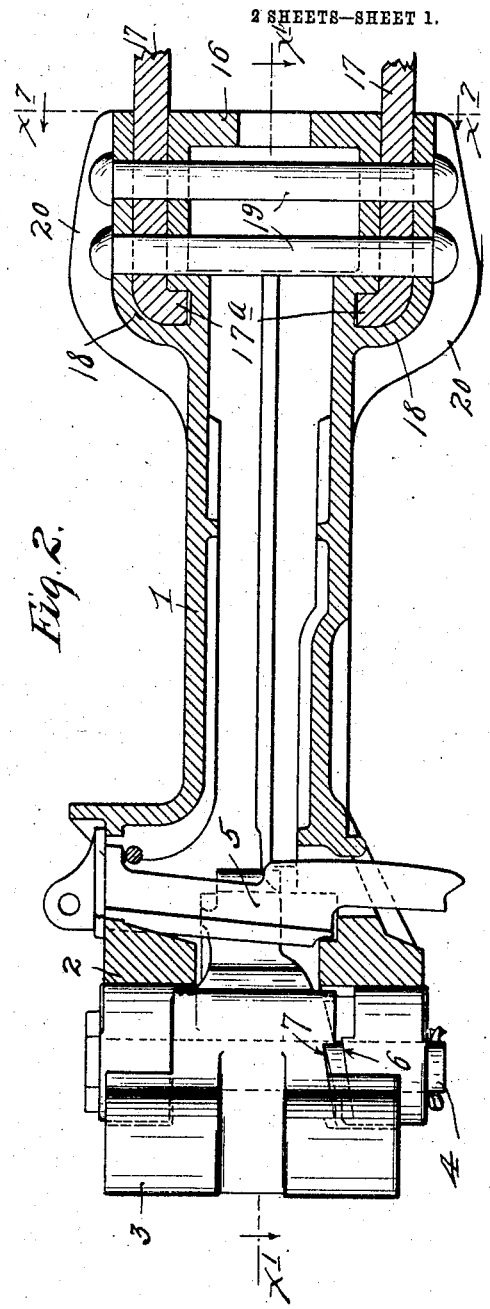

Figure 1 is a view principally in horizontal section on the line $x'\ x'$ of Fig. 2, but with the knuckle shown in full plan view, illustrating a coupler designed in accordance with my invention. Fig. 2 is a vertical section on the line $x^2\ x^2$ of Fig. 1, but showing the lock-dog in full. Fig. 3 is a vertical section taken on the line $x^3\ x^3$ of Fig. 1. Fig. 4 is a vertical section taken on the line $x^4\ x^4$ of Fig. 1. Fig. 5 is a vertical section taken on the line $x^5\ x^5$ of Fig. 1. Fig. 6 is a detail, partly in plan and partly in horizontal section, on the line $x^6\ x^6$ of Fig. 3, some parts being broken away; and Fig. 7 is a vertical section on the line $x^7\ x^7$ of Fig. 2.

The numeral 1 indicates the draft-bar, the numeral 2 the coupler-head, the numeral 3 the knuckle, the numeral 4 the knuckle-pintle, and the numeral 5 the vertically-movable lock-dog, of an automatic coupler of the so-called "Washburn" type.

The automatic knuckle-opening mechanism in its most approved form is constructed and applied as follows: The lower knuckle-supporting lug of the coupler-head is formed with a plurality of ratchet-like cam-surfaces 6, and the hub of the knuckle 3, for coöperation therewith, is formed in its under surface with a plurality of similar but reversed cam-surfaces 7. When the knuckle is lowered, the cam-surfaces 6 and 7 will engage and will cause gravity to automatically swing the knuckle into an extreme open position, as indicated by dotted lines in Fig. 1. These cam-surfaces 6 and 7, as will presently more fully appear, do not engage when the knuckle is closed and are brought into engagement with each other only after the knuckle has been swung part way open. Normally or when the knuckle is closed the said knuckle is raised, as shown in the drawings, by the engagement of a cam-surface 8 on the tail thereof with a cam-surface 9, which cam-surface 9, as shown, is formed on a lug 10, projecting inward from one side wall of the coupler-head, as best shown in Figs. 5 and 6, but see also Fig. 1. When the lock-dog 5 is dropped into a locking position, as shown in the drawings, the cam-surfaces 8 and 9 are held in contact, and the knuckle is thereby held in its raised position, with its cam-surfaces 7 a considerable distance above the cam-surfaces 6.

For coöperation with the cam-surfaces described I provide a knuckle-opening device which in itself involves novel features of construction and which under the closing movement of the knuckle is rocked by the knuckle and in turn acts upon the knuckle to raise the same and when the knuckle is released is rocked by the weight of the knuckle and acts upon the knuckle to impart an opening movement thereto. This device, in the form of a bell-crank lever 11, is mounted in a recess 12, formed in one wall of the coupler-head and in the vicinity of the cam-surface 9. The pin 13, seated in the coupler-head, affords a pivot or fulcrum for the lever 11. The lower and shorter arm of this bell-crank lever 11 stands in position for engagement with the bearing-surface 14, which, as shown, is formed on the bottom of the knuckle-hub and is provided with a shoulder 15. (See particularly Figs. 1, 4, and 6.) The upper and longer arm of the bell-crank lever 11 stands in position for engagement with the rear face of the knuckle-tail close to the hub of the knuckle. The relation of the parts is such that when the knuckle is held in its extreme uppermost position by the engagement of the cam-surfaces 8 and 9 the knuckle-surface 14 will be raised slightly above the end of the short arm of the bell-crank 11, as shown in Fig. 4. When the knuckle is released by a movement of the lock-dog 5 into a releasing position, gravity acting on the knuckle will cause the engaged cam-surfaces 8 and 9 to impart an initial opening swinging movement to the knuckle, and the said knuckle will under this initial opening movement lower slightly and bring the surface 14 onto the free end of the short arm of the bell-crank 11. This being done, the entire weight of the knuckle is thrown onto the short end of the bell-crank, and the downward force on the said arm will rock the said bell-crank and cause the long upwardly-projecting arm thereof to exert a lateral or horizontal pressure against the tail of the knuckle, having the effect of opening the knuckle with a swinging or pivotal movement. The knuckle will thus be given approximately one-half of its swinging opening movement by the bell-crank 11 and under such movement will constantly lower until the cam-surfaces 6 and 7 are brought into engagement, thereby transferring the weight of the knuckle from the said bell-crank to the said cam-surfaces. These cam-surfaces 6 and 7 when engaged as described will, as is evident, complete the opening movement of the knuckle and cause the knuckle to remain or stand in an opened position until force is applied thereto tending to close the same. Under the initial closing movement of the knuckle the cam-surfaces 6 and 7 will cause the knuckle to rise, so that the surface 14 thereof will be carried over the free end of the short arm of the bell-crank 11. When under the closing movement of the knuckle the tail thereof is moved against the upwardly-projecting long end of the bell-crank, the said bell-crank will be rocked, and its short end will be brought into action on the knuckle-surface 14, and the knuckle will be positively raised by the said bell-crank. At the limit of its final closing movement the cam-surfaces 8 and 9 are brought into engagement, and by these surfaces, as already indicated, the knuckle will be slightly raised off from the short arm of the said bell-crank. Under the above action most of the vertical movement imparted to the knuckle is accomplished by the action of the bell-crank lever and under a minimum of friction. In some arrangements the knuckle may be raised and opened entirely by the action of the bell-crank lever or similar pivoted device.

The draft-bar 1 at its rear end is formed with the usual shouldered head 16, which fits between the ends of a draft-yoke 17. In the usual construction the ends of the yoke 17 would be directly riveted to this shouldered head 16 and the outer ends of the rivets would have no other supports than the said yoke 17.

In accordance with one feature of my invention I provide the draft-bar 1 with webs 18, that overlap the ends of the yoke 17, as best shown in Fig. 2, and the rivets 19 are passed through these webs 18, through the prongs of the yoke 17, and through the head 16. By this arrangement the outer ends of the rivets are prevented from being bent under bumping and draft strains, and the shearing strain on the rivets is applied at two points above the head 16 and at two points below the said head 16. Otherwise stated, in order to shear off the rivets they would have to be cut at four points—to wit, at two points above the head 16 and at two points below the head 16. The seats formed between the webs 18 and the head 16 are open at their sides, so that the ends of the yoke 17 may be applied in working position by lateral movement of the yoke with respect to the draft-bar or of the draft-bar with respect to the yoke. The inturned ends $17^a$ of the yoke 17 fit in pockets or grooves formed between the shoulders of the head 16 and the bases of the webs 18. The said webs 18 are preferably formed with reinforcing-ribs 20.

From what has been said it will be understood that the mechanism described is capable of modification within the scope of my invention as herein set forth and claimed.

What I claim, and desire to secure by Letters Patent of the United States, is as follows:

1. In a coupler of the Master Car-Builders' type, a two-armed lever pivotally mounted in the coupler-head and operating on the knuckle, to open the same, under the action of gravity, substantially as described.

2. In a coupler of the Master Car-Builders' type, the combination with cam-surfaces on the knuckle, and on the coupler-head, arranged to support the knuckle when said knuckle is closed, of a lever mounted in said coupler-head and operating on said knuckle, to open the same, under the action of gravity, when said knuckle has received an initial opening movement under the action of said cam-surfaces, substantially as described.

3. In a car-coupler of the Master Car-Builders' type, a pivoted bell-crank lever mounted in the coupler-head, with one arm in position to engage and lift the knuckle, and with its other arm in position to be engaged by the tail of the knuckle, the said lever operating to open the knuckle, substantially as described.

4. In a coupler of the Master Car-Builders' type, the combination with the bell-crank lever 11 pivotally mounted in the coupler-head with one end in position to engage the under surface of the knuckle, and with its other arm in position to be engaged by the tail of the knuckle, the said lever operating to raise the knuckle, under its closing movement, and to force the knuckle into an open position under the action of gravity when the knuckle is released, substantially as described.

5. In a coupler of the Master Car-Builders' type, the combination with cam-surfaces on the knuckle and on the coupler-head, arranged to support the knuckle when it is closed, of a lever mounted in the coupler-head and operating on the knuckle to raise the same under a closing movement, and to impart an opening movement thereto, under the action of gravity, after the said knuckle is released, and has received an initial opening movement by the said cam-surfaces, substantially as described.

6. In a coupler of the Master Car-Builders' type, the combination with cam-surfaces on the knuckle and on the coupler-head arranged to support the knuckle when the knuckle is open, or approximately open, of a lever mounted in the coupler-head and acting on said knuckle, to raise the same under its closing movement, and to impart an opening movement to said knuckle when said knuckle is released, substantially as described.

7. In a coupler of the Master Car-Builders' type, the combination with cam-surfaces on the knuckle and on the coupler-head arranged to support the knuckle when in its extreme open and when in extreme closed positions, of a lever mounted in the coupler-head and acting on the knuckle when said knuckle is in an intermediate position, said lever serving to raise said knuckle under its closing movement and to force the same from an open to a closed position, under the action of gravity, substantially as described.

8. In a coupler of the Master Car-Builders' type, the combination with cam-surfaces 8 9 respectively on the tail of the knuckle and on the coupler-head, and cam-surfaces 6 and 7 respectively on the knuckle-hub and on one hinge-lug of the coupler-head, of the bell-crank lever 11 pivotally mounted in the coupler-head, the one arm in position to engage an under surface of the knuckle, and with its other arm in position to be engaged by the tail of the knuckle, said cam-surfaces 8 and 9 supporting the knuckle in a closed position, said cam-surfaces 6 and 7 supporting the knuckle in an open position, and said lever 11 acting on said knuckle when the latter is in an intermediate position, substantially as described.

In testimony whereof I affix my signature in presence of two witnesses.

EDWIN C. WASHBURN.

Witnesses:
 H. D. KILGORE,
 F. D. MERCHANT.